United States Patent [19]

Collins

[11] Patent Number: 4,603,546
[45] Date of Patent: Aug. 5, 1986

[54] CONTROL SYSTEMS FOR GAS TURBINE AEROENGINES

[75] Inventor: Brian J. Collins, Box 63, Mickleover, England

[73] Assignee: Rolls-Royce Limited, London, England

[21] Appl. No.: 755,433

[22] Filed: Jul. 16, 1985

[51] Int. Cl.$^4$ ............................. F02C 9/18; F02C 9/52
[52] U.S. Cl. .................................. 60/39.02; 60/39.27; 60/39.29
[58] Field of Search ............... 60/39.02, 39.27, 39.281, 60/39.29; 415/11, 26, 27, 28

[56] References Cited

U.S. PATENT DOCUMENTS 3,540,214 11/1970 Stirgwolt ........................... 60/39.29
3,852,958 12/1974 Adams et al. ..................... 60/39.281
4,060,980 12/1977 Elsaesser ............................ 60/39.29
4,164,034 8/1979 Glennon et al. ................... 60/39.29

Primary Examiner—Louis J. Casaregola
Attorney, Agent, or Firm—Cushman, Darby & Cushman

[57] ABSTRACT

Surge conditions in the compressor of a gas turbine aeroengine can be automatically controlled by a surge control system in which compressor outlet pressure is monitored and a signal P corresponding to it is processed in a surge detector to determine the ratio P/P and to compare the value of the ratio with a predetermined reference value, surge correction control signals being outputted whenever a surge is detected. Surge is controlled as these signals actuate various units linked with the surge detector, these units achieving bleeding off of air from the compressor, reduction of the mass flow of fuel to the aeroengine, and maintenance of fuel ignition for a predetermined period.

12 Claims, 6 Drawing Figures

Fig. 1. LIMITS OF STABLE AIRFLOW

CONTROL SYSTEMS FOR GAS TURBINE AEROENGINES

The present invention relates to control systems for gas turbine aeroengines, and in particular to a method and apparatus for control of surge conditions in the aeroengines' compressor.

Various types of control systems for gas turbine aeroengines are known, their basic purpose being to regulate the operation of the engine so as to achieve the power output specified by the pilot with satisfactory safety, engine component life and fuel economy. In order to achieve safe operation with maximum fuel economy, some engines incorporate, as an adjunct to the main control system, a system of bleed valves which the control system actuates selectively in order to draw off air from the compressor. Thus, the bleed valves are opened when the engine is accelerating in order to ensure an adequate surge margin for the compressor, and are closed when the engine is at steady state conditions, such as idle or cruise, in order to ensure minimum fuel usage.

We have now found that when such an engine has sustained damage to compressor blades due to ingestion of foreign objects, it is liable to have insufficient surge margin to operate satisfactorily at steady-state idling conditions, even though it will operate satisfactorily at high power settings. It is therefore an object of the pursuit invention to provide a control system which will permit operation of a damaged or undamaged engine without substantial danger from surge and which at the same time will continue to provide good fuel economy.

The present invention achieves this by reliably detecting compressor surge and taking appropriate action to restore normal operation without intervention from the pilot.

According to the present invention, a method for automatically controlling compressor surge conditions in a gas turbine aeorengine comprises in automatic sequence the steps of:
(a) continuously monitoring the value of the pressure at a predetermined location in the compressor;
(b) detecting the onset of compressor surge conditions by detecting occasions when the ratio of the first derivative with respect to time of the monitored pressure to the monitored pressure itself is less than a predetermined reference value; and
(c) initiating action to control the surge whenever the onset of surge conditions is detected.

Action to control the surge should include bleeding air from the compressor, and preferably also includes reducing the mass flow of fuel to the aeorengine.

In more detail, the aeroengine may be equipped with compressor handling bleed valves, a bleed valve control unit, a fuel ignition unit, a fuel control system having a resettable fuel flow schedule, and means for temporarily but greatly reducing the flow of fuel to the aeroengine, the method of automatic control comprising in automatic sequence the steps of:
(a) continuously monitoring the value of the pressure at a predetermined location in the compressor;
(b) detecting the onset of compressor surge conditions by detecting occasions when the ratio of the first derivative with respect to time of the monitored pressure to the monitored pressure itself is less than a predetermined reference value;
(c) initiating action to control the surge whenever the onset of surge conditions is detected, said action including opening the compressor handling bleed valves according to a predetermined operating schedule of the bleed valve control unit, operating the fuel ignition unit for a predetermined period during which flameout is likely, resetting the fuel control system to a predetermined low fuel flow schedule, and operating said means for temporarily but greatly reducing the flow of fuel to the aeroengine.

The monitored pressure is preferably the pressure at the outlet of the compressor.

The invention also includes apparatus for automatically controlling compressor surge conditions during operation of a gas turbine aeroengine, the apparatus including:
(a) pressure transducer means for producing a pressure signal representative of the value of the pressure at a predetermined location in the compressor;
(b) data processing means adapted to monitor the pressure signal, produce therefrom the first derivative of the pressure signal with respect to time, determine the ratio of the first derivative of the pressure signal to the pressure signal itself, compare the value of the ratio with a predetermined reference value, and output at least one surge correction control signal when the ratio is less than the predetermined reference value; and
(c) surge correction means adapted for actuation by the at least one surge correction control signal.

Preferably, the predetermined location in the compressor is the outlet of the compressor.

The surge correction means should include bleed valve means for bleeding air from the compressor and preferably also includes means for reducing the mass flow of fuel to the aeroengine. Such means for reducing the mass flow of fuel may include resettable fuel flow scheduling means adapted to be reset to a low range of fuel flows when the at least one surge correction control signal is outputted from the data processing means, and may also or alternatively include means adapted to temporarily but greatly reduce the flow of fuel to the aeroengine by withdrawing fuel from a main fuel supply line to the aeroengine.

Advantageously, the surge correction means also includes a fuel ignition unit adapted to be operated for a predetermined period during which flameout is likely when a corresponding surge correction control signal is outputted from the data processing means.

An embodiment of the invention will now be described, by way of example only, with reference to the accompanying drawings, in which.

Figure 1:
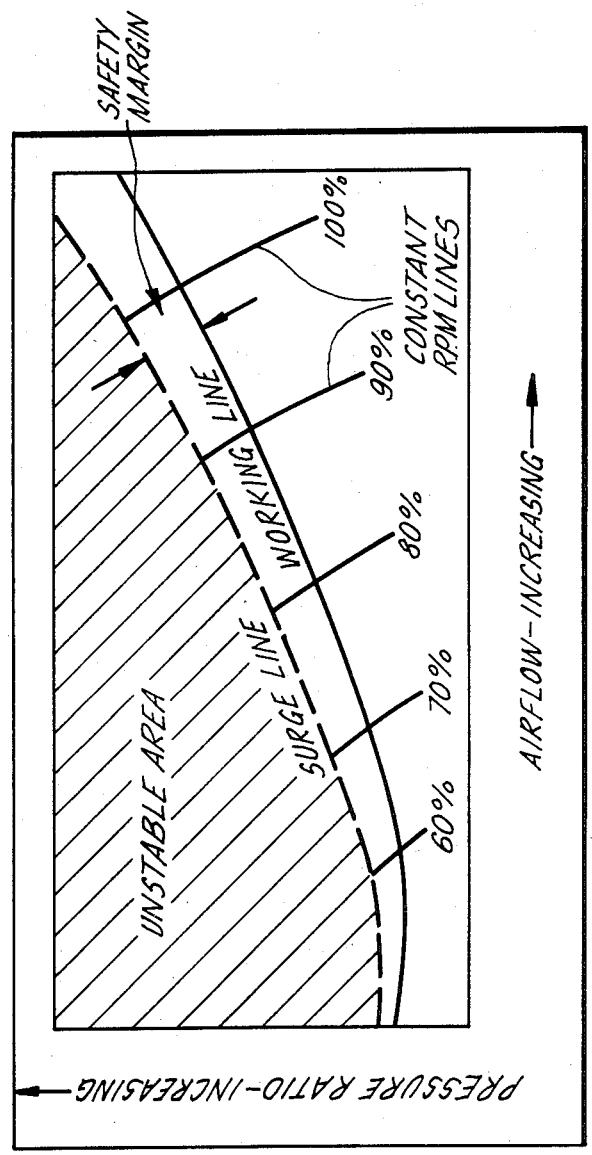
FIG. 1 is a graphical plot of compressor stage pressure ratio against increasing airflow through the stage for various values of rotational speed, the graph indicating the limits of stable airflow.

The immediately following three paragraphs give the background information for understanding FIG. 1.

Modern gas turbines generally have multi-stage compressors and each stage of a multi-stage compressor possesses certain airflow characteristics that are dissimilar from those of its neighbour; thus, to design a workable and efficient compressor, the characteristics of each stage must be carefully matched. This is difficult to do if reasonable matching is to be retained over a wide range of compressor operating conditions such as an aeroengine encounters.

Outside the design conditions, the flow around the blades tends to degenerate into violent turbulence and the smooth pattern of flow through the stage or stages is destroyed. This condition is known as "stall" or "surge", the difference between the two terms being mainly a matter of degree; whereas during stalling the normal flow through the compressor does not completely break down, during a surge the flow is completely reversed. A stall may be such as to produce only a slight vibration in the compressor, or poor acceleration or deceleration characteristics; or if more severe, a rise in turbine gas temperature and "coughing" of the compressor. A surge is evidenced by a bang of varying severity from the engine and a sharp rise in turbine gas temperature, and if prolonged or repeated can cause damage to the engine. Some types of engine can spontaneously partly recover from a surge and continue to operate in a partly stalled condition, which if disturbed by a change in fueling soon transitions to surge again.

The value of airflow and pressure ratio at which a surge occurs is termed the "surge point". This point is a characteristic of each compressor speed, and a line which joins all the surge points, called the "surge line", is drawn in FIG. 1 to define the minimum stable airflow which can be obtained at any rotational speed.

Although designers will attempt to design a compressor to have a good safety margin, as shown on FIG. 1, between the working line and the surge line, i.e. between the airflow and the compression ratio at which it will normally be operated and the airflow and compression ratio at which a surge will occur, nevertheless exceptional operating conditions, damage to the engine, or malfunction of the fuel control system, may still make the compressor prone to surge. This is to be avoided if at all possible since surges tend to damage the compressor, and the present invention is aimed at rescuing the compressor from the worst effects of a surge, including subsequent operation in partially stalled mode.

Figure 2:
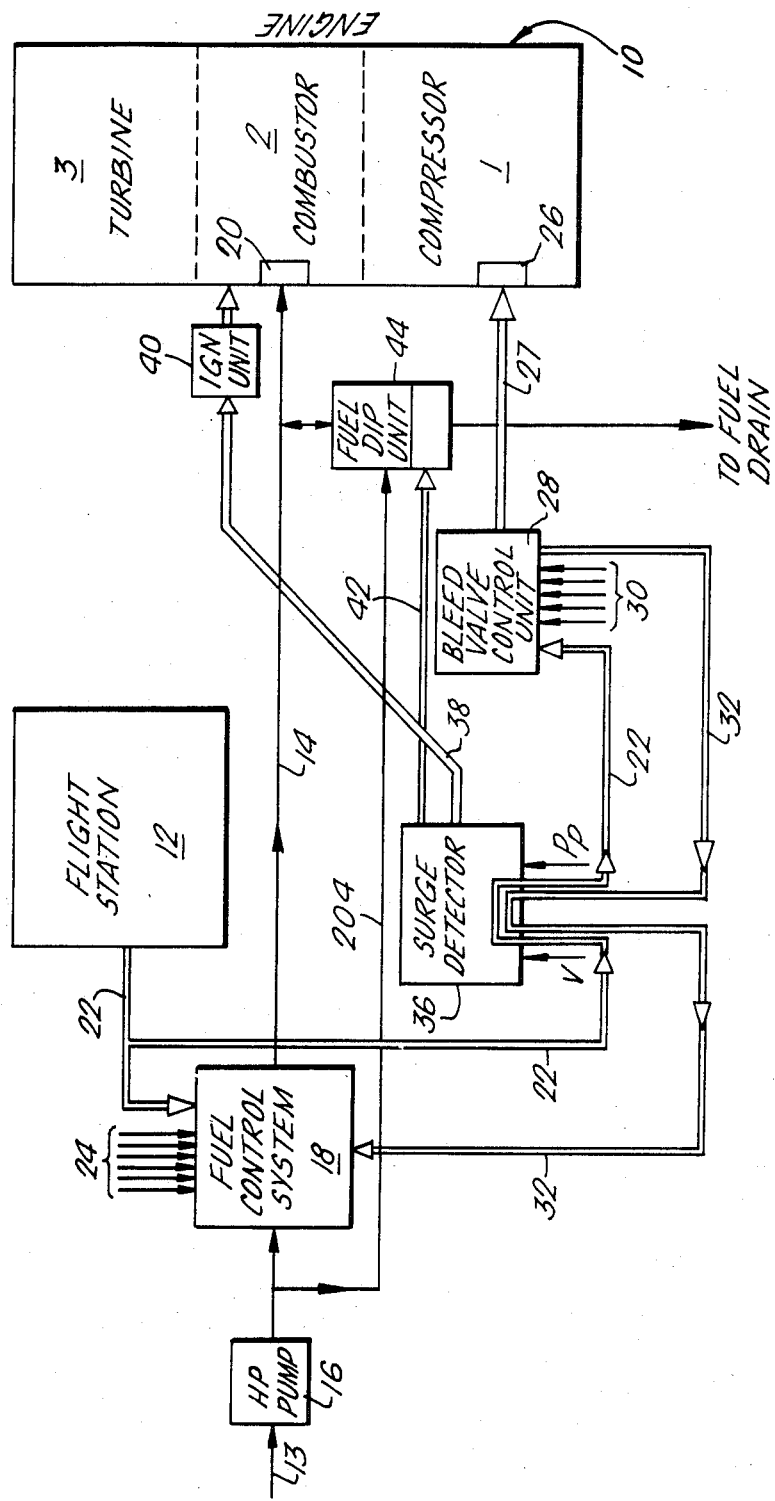
FIG. 2 is a block diagram showing the main components of a fuel control system incorporating apparatus according to the present invention.

Referring now to FIG. 2, there is shown a simplified block diagram of the major systems and components relevant to the working of the invention.

The engine 10 is controlled from the crew's flight station 12 to effect engine starting, stopping and power (thrust) selection. The engine 10 is exemplified by one of the well-known RB211 (Registered Trade Mark) series of engines manufactured by Rolls-Royce Limited, which is a three spool configuration, with low, intermediate and high pressure compressor and turbine sections, plus air intake, bypass, combustion and exhaust sections. For details of these the Rolls-Royce publication "The Jet Engine", Revised 3rd Edition, should be consulted, or any modern text on gas turbine aeroengines. The compressor, combustor and turbine sections are indicated generally as blocks 1, 2 and 3 respectively in engine 10.

The task of the fuel supply system shown in FIG. 2 is automatically to deliver fuel in fuel line 14 to engine 10 at an economical flow rate consistent with engine power requirements set by the pilot in the flight station 12, whilst automatically avoiding surge conditions in the engine.

Fuel from the aircraft fuel supply 13 is delivered to a high pressure fuel pump 16, which delivers the fuel through the fuel control system 18 to a fuel manifold 20 in engine 10. Manual control of fuel flow for engine starting and stopping is effected from flight station 12 by means of a switch (not shown) which controls the power supply to an electrically actuated shut-off valve (not shown) within the fuel control system 18.

At all engine speeds of idle and above, the fuel flow in fuel line 14 is controlled by the fuel control system 18 to maintain the power set by the pilot, irrespective of ambient temperature, up to specific I.S.A. limits during take-off, climb and cruise, but above these temperatures it can restrict engine power to prevent limiting values of engine shaft speed and exhaust gas temperature being exceeded. To do this the fuel control system 18 schedules and trims fuel flow in fuel line 14 in accordance with the engine power setting control signal 22 from flight station 12 and certain other controlling parameters 24. These parameters include data on engine conditions and flight conditions.

Such fuel control systems have been implimented in various ways and information on their components and detailed operation are publically available in text books, journal articles, operation manuals, and maintenence manuals.

The engine 10 is provided with solenoid actuated compressor bleed valves 26 which can be opened and closed by control signal 27 from a bleed valve control unit 28 in order to ensure the efficient operation of engine 10 over a wide speed range and to maintain the surge safety margin of the engine's compressor. The bleed valve control unit 28 opens the bleed valves 26 at low compression ratios when the surge margin may be inadequate and closes them when the engine is operating at or above its design condition. When the bleed valves are open, the air bled from the compressor is dumped into the bypass duct of the engine 10 and the airflow across the stages of the compressor downstream of the bleed valves is decreased, whilst that across the stages before the bleed valves is increased. This prevents the rear stages from choking due to high axial air velocity, and the front stages from stalling because of low mass airflow.

The bleed valve control unit 28 automatically schedules the opening and closing of the bleed valves 26 in accordance with various inputs, namely the engine power setting control signal 22 from flight station 12 and certain other controlling parameters 30, including data on engine and flight conditions. Note that input signal 22 to the bleed valve control unit 30 first passes through surge detector 36, but, as explained later, is not thereby affected unless a surge is detected.

It can often happen that the pilot requires the engine 10 to accelerate whilst the bleed valves are open and this can require a greater fuel flow 14 to fuel manifold 20 than would be allowed by the normal fuel flow schedule for acceleration which is programed or otherwise built into the fuel control system 18. Consequently, the bleed valve control unit 28 outputs a signal 32 to the fuel control system 18 when enough bleed valves are open during an acceleration to require the greater fuel flow, and this resets the schedule to allow increased flow whilst the signal 32 remains. Again, note that signal 32 from the bleed valve control unit 28 first passes through surge detector 36 before being input to the fuel control system 18, but is not affected by detector 36 unless a surge is detected.

The bleed valves 26 and their control unit 28 with its link to the fuel control system 18 are known items of technology in themselves and require no further description here; see for example, the publication "The Jet Engine", already mentioned. However, the surge detector 36 relates directly to the present invention.

The purpose of the surge detector 36 is not only to detect the onset of a compressor surge, but also, in conjunction with other units 18,28,40 and 44, to take corrective control action to allow the engine to recover from the surge. As discussed previously, this is particularly important in the case of compressors damaged by ingestion of foreign objects such as birds.

A secondary purpose is to indicate to maintenance crews that a surge has temporarily occurred.

In order to detect the onset of a surge, the surge detector 36 is provided with input data on two engine parameters in the form of signals V and Pp. V is merely an on/off signal which when present indicates that the engines' electrical generator (not shown) is powered up; i.e. that the engine is running fast enough for surge to be a potential problem. Signal V enables a logic gate in surge detector 36 and initiates the surge detection process.

The engine parameter used to detect a compressor surge is the high pressure compressor delivery pressure, which is input to surge detector 36 as a pneumatic signal Pp. During an engine surge Pp drops rapidly by a significant amount but values of Pp vary with altitude. To ensure reliable detection of surge independent of altitude, the surge detector 36 processes an electrical signal P representing Pp, to produce a unique surge control parameter, P/P, i.e. the ratio of the first derivative of P to P itself. If the value of P/P drops below a certain reference value, this is recognised by surge detector 36 as the onset of surge. The reference value is chosen as a result of doing engine tests throughout the expected flight envelope of the engine, and must incorporate a margin of error relative to transient values of P/P which would be expected during normal handling manoevres. As an example, a surge reference of $P/P \leq -4.7 \pm 0.7$ was chosen for one engine type as a result of doing engine tests from sea level to 12800 meters. This value gave a minimum margin of error of 2:1 relative to expected P/P transients.

After detection of surge, the sequence of events initiated by the surge detector 36 is as follows:

(a) cancel signal 22 to the bleed valve control unit 28, causing the bleed valves 26 to open, and initiating a safe bleed valve operating schedule to prevent further surges;

(b) send signal 38 to switch on an ignition unit 40;

(c) cancel signal 32 to ensure that the fuel flow schedule in the fuel control system 18 is on the lower range of values, despite the fact that the bleed valves 26 are open;

(d) send signal 42 to actuate a fuel dip unit 44 in order temporarily to reduce by a large amount the fuel flow rate into engine fuel manifold 20. This is accomplished by means of the fuel dip unit 44 withdrawing fuel from the supply line 14.

N.B. At this stage the engine will recover from the effects of the surge.

(e) cancel signal 42 to allow the fuel flow to steady down to the lower schedule allowed by the fuel control system 18.

Figure 3:
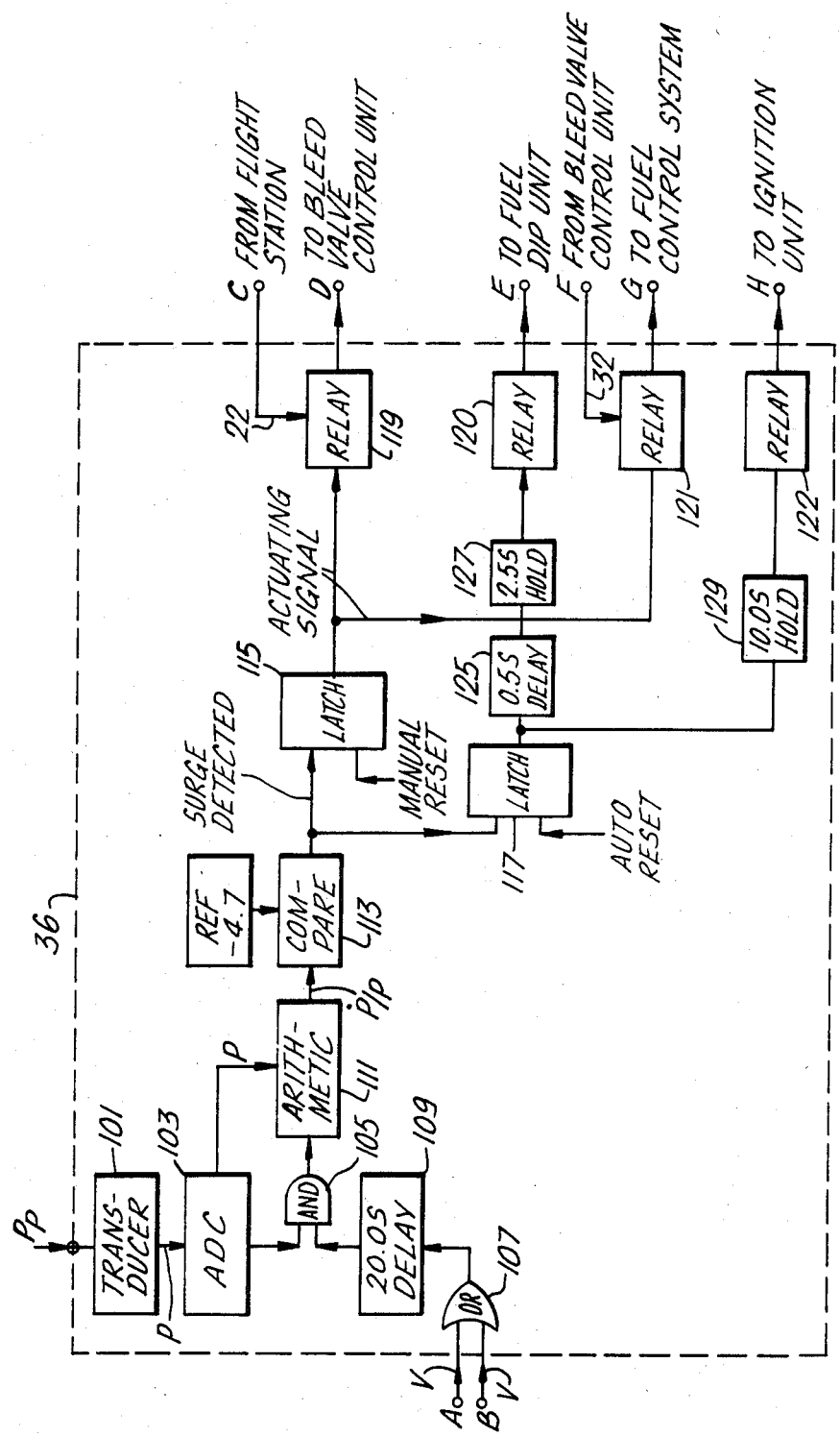
FIG. 3 is a block diagram showing the internal workings of a surge detector utilised in the system of FIG. 2.

The internal workings of the surge detector 36 will now be considered in more detail with reference to FIG. 3.

The surge detector 36 is a digital system except for analogue input of the Pp signal. The digital processing is preferably implimented by a computer circuit board controlled by a 16-bit microprocessor. All the output signals are switched by sealed relays 119 to 122 having terminals C to H.

The pneumatic signal Pp is fed to the surge detector 36 from a tapping in a pneumatic line to the fuel control system 18, which also utilises the signal. Pneumatic signal Pp is supplied to a strain gauge pressure transducer 101 mounted within unit 36. The output of transducer 101 is an analogue voltage P proportional to the absolute pressure of the pneumatic signal Pp. Analogue-to-digital converter 103 digitises the analogue signal P every 5 milliseconds provided P is greater than a certain minimum value indicative of an engine start, and passes it to an input register of arithmetic function 111, which is actually carried out by the computer. Each time P is digitised, the ADC 103 also pulses the AND gate 105. AND gate 105 is enabled by receiving the signal from ADC 103 and also another signal V from either of terminals A or B connected to OR gate 107. In turn, AND gate 105 enables the input register of function 111 to accept digital signal P from ADC 103. The presence of AND gate 105 ensures that surge detection is inhibited during an engine start, because terminals A and B are connected to receive a voltage signal V from the primary and back-up engine electrical generators respectively, indicating that at least one electrical generator is functioning and being driven at a predetermined minimum speed by the engine. The signal(s) V on terminals A and/or B must continue for at least 20 seconds before a start is registered due to the incorporation of a 20 second delay circuit 109 between OR gate 107 and AND gate 105. This ensures that the engine start is genuine and not an aborted one.

The input register of arithmetic function 111 is a five-byte shift register and P/P is computed as follows. A new value of P is read into the register every 5 milliseconds. Each time a new value of P is input, the first and last bytes in the register are compared and the result is passed to another register as a difference signal. Hence, the change in P over the previous 20 milliseconds ($\Delta P$) is calculated every 5 milliseconds. To arrive at the desired value P/P, $\Delta P$ is then divided by the sample interval, 20 milliseconds, and by the latest value of P as represented by the first byte in the shift register, i.e. $P/P = \Delta P/0.02P$.

Signal P/P is passed to comparator function 113 (also performed by the computer) where its value is compared with a reference value of $-4.7$ in ROM. If $P/P \leq -4.7$ (for example $-5, -6 \ldots$) for two consecutive values of P/P, this is recognised as a surge, and latch circuits 115 and 117 are set by receipt of a pulse from comparator function 113. Because a surge is only detected if two consecutive values of P/P drop below the reference value, it takes 25 milliseconds to detect a surge; 20 milliseconds for the sample period, plus 5 milliseconds for the next P/P. This is sufficiently fast. Two values are required to guard against spurious signals.

When the output of latch circuit 115 goes high due to detection of a surge by comparator 113, the signal actuates a relay 119. Normally, the relay 119 merely conducts the signal 22, representing the power lever angle in flight station 12. This signal passes through relay 119 without being affected and acts as one of the controlling parameters of the bleed valve control unit 28 (see FIG. 1). However, when relay 119 is actuated due to detection of a surge, the connection between C and D terminals is broken, the signal 22 is removed from the bleed valve control unit 28, and the unit automatically selects a safe schedule for opening and closing the bleed valves to avoid further surges. Whilst the engine is at low powers, this schedule dictates that the bleed valves are all open. This bleed valve schedule remains in control until the latch 115 is reset manually during subsequent ground-based inspection of the engine.

During surge conditions, latch 115 also actuates relay 121. Normally, relay 121 merely conducts signal 32 when it is present (see FIG. 1), which is the signal generated by the bleed valve control unit 28 to reset the fuel flow schedule in fuel control system 18 to a higher level during accelerations, as explained previously. Under normal conditions, signal 32 is unaffected by the surge detector 36, but when relay 121 is actuated during surge conditions, the circuit through F and G terminals is broken, and the signal 32 is removed from fuel control system 18, the fuel flow schedule automatically reverting to the lower level. The low fuel schedule is maintained until latch 115 is reset manually.

When the output of latch circuit 117 goes high during surge conditions, both the fuel dip unit 44 (FIG. 1) and the ignition unit 40 are actuated by means of relays 120 and 122 respectively.

The relay 120 is only actuated after a delay of 0.5 seconds controlled by timing circuit 125. This delay is to allow sufficient time for the bleed valves to open fully before the fuel flow to the manifold 20 is substantially reduced. The signal to relay 120 is held on for 2.5 seconds by timing circuit 127 to ensure satisfactory actuation of the fuel dip unit 44 (FIG. 1), though in fact the period of the fuel dip is controlled entirely by the fuel dip unit.

Relay 122 is actuated immediately when a surge is detected, the signal to the relay being held on for 10 seconds by a timing circuit 129. This in turn causes actuation of the high energy ignition unit 40 (FIG. 1); the maintenance of ignition for 10 seconds ensures that actual fuel ignition in the engine's combustion chambers is sustained until the danger of a "flame-out" due to surge conditions is past.

It should be noted here that latch circuit 117 is automatically reset by a reset pulse from the computer every 5 seconds, thus allowing re-operation of fuel dip unit 44 and ignition unit 40 every 5 seconds. This allows for the possibility of multiple surges.

Figure 4:
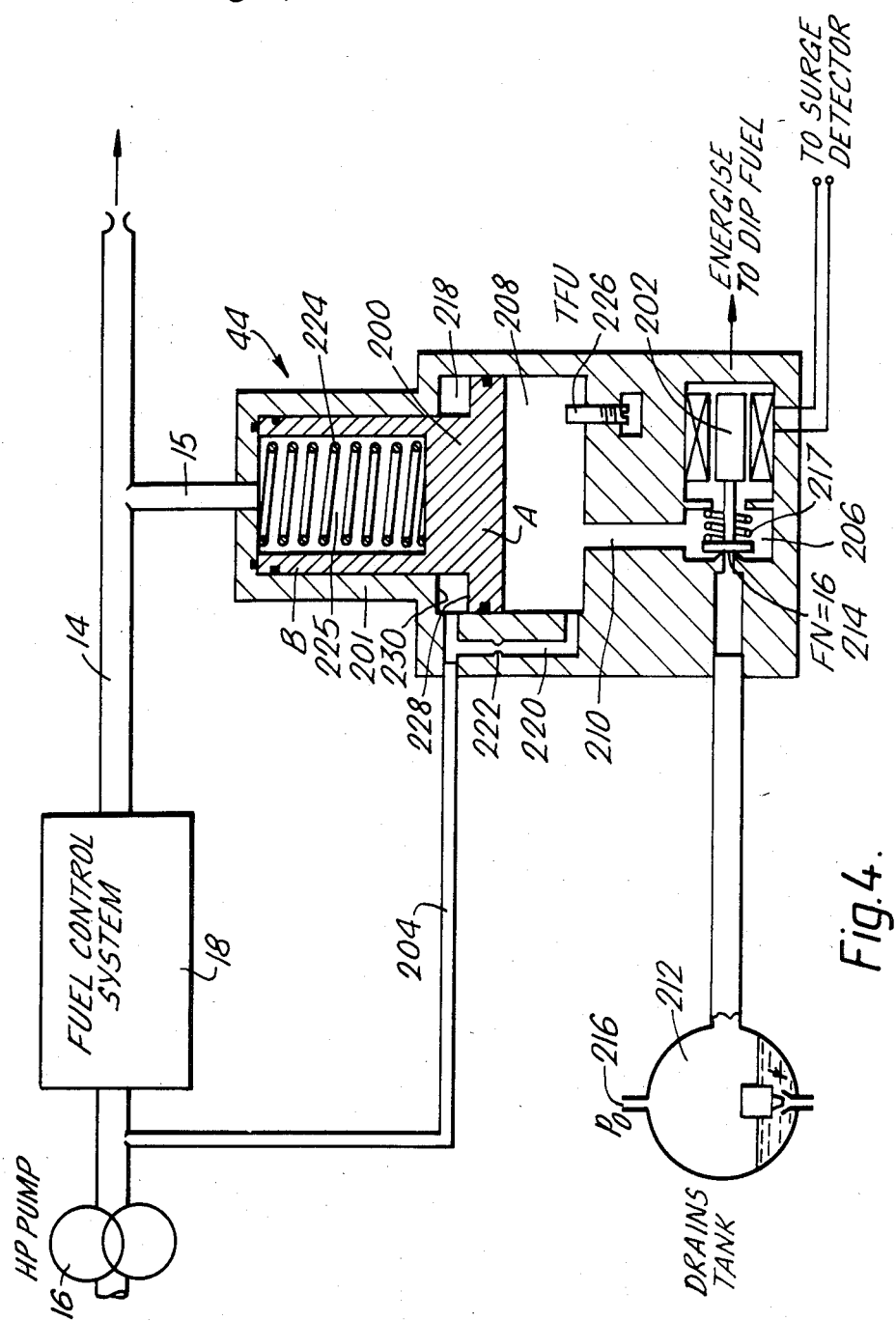
FIG. 4 is a schematic diagram of a fuel dipping unit utilised in the system of FIG. 2.

Referring now to FIG. 4, the construction and working of the fuel dip unit 44 will be described in more detail in the context of associated apparatus.

Unit 44 can be termed a fuel accumulator, which, as already explained, is actuated for short periods to remove fuel from the fuel supply line 14. Unit 44 basically consists of a stepped-diameter piston 200, a stepped diameter housing 201 and a control solenoid valve 202, 214. The stepped-diameter piston 200 has a lower large-diameter portion A and an upper small-diameter portion B. FIG. 4 shows the normal position of the piston 200 within the housing 201 and it will be seen that the top of portion B makes sealing contact with the top of the housing 201. The majority of portion B is hollow and this provides a cylindrical fuel-filled chamber 225 which communicates with fuel line 14 via connecting pipe 15. Chamber 225 also houses the biasing spring 224. The stepped shape and relative dimensions of the piston 200 and housing 201 ensure that in all positions of the piston, an annular fuel-filled chamber 218 is defined between the top surface 228 of portion A of piston 200 and the internal surface 230 of housing 201 formed by the step change in diameter of the housing. A further fuel-filled chamber 208 is defined in the large diameter part of housing 201, beneath portion A of the piston 200, and this is in communication through passage 210 with a fourth fuel-filled chamber 206, which houses the control solenoid 202 and its bias spring 217.

The piston 200 is driven by fuel at high pressure in fuel line 204, which is connected to the outlet side of the high pressure fuel pump 16. In normal flight, the solenoid 202 is de-energised so that valve 214 is closed under the action of spring 217. High pressure fuel from fuel line 204 is fed to both sides of portion A of piston 200 simultaneously, the fuel to the annular chamber 218 being a direct feed through a continuation of fuel line 204 and the fuel to the cylindrical chamber 208 being fed through a passage 220 containing a restrictor orifice 222.

High pressure fuel on both sides of the portion A causes the piston to be in the position shown, with the spring 224 fully compressed, because the pressure force on the lower surface of portion A is greater than the force of the spring plus the pressure forces on the upper surfaces of portion A and portion B. In this condition the fuel dip unit 44 has no effect on the fuel flow in line 14.

In the event of an engine surge the surge detector 36 energises the solenoid 202, opening valve 214 and causing the high pressure fuel in chamber 208 to be vented to the drains tank 212. This causes the piston 200 to move rapidly downwards under the influence of the spring 224 and the high pressure fuel in the chamber 218 (plus the lower pressure in chamber 225). This causes the fuel flow to the engine to drop, because the fuel system cannot respond fast enough to compensate for the fast piston movement, and the fuel flow in line 14 continues to drop until the piston 200 hits a mechanical stop 226. Stopping the piston restores the engine fuel flow to a steady state condition.

Upon being deenergised, the valve 214 is again shut but high pressure fuel continues to flow through passage 220 and causes the piston 200 to return to the spring compressed condition. Due to the restrictor orifice 222 and spring 224 the piston 200 returns to the steady state position slowly (over a period of about 13 seconds) and because this is so, the fuel control system 18 has time to compensate for the piston movement and hence avoid overfueling the engine.

Figure 5:
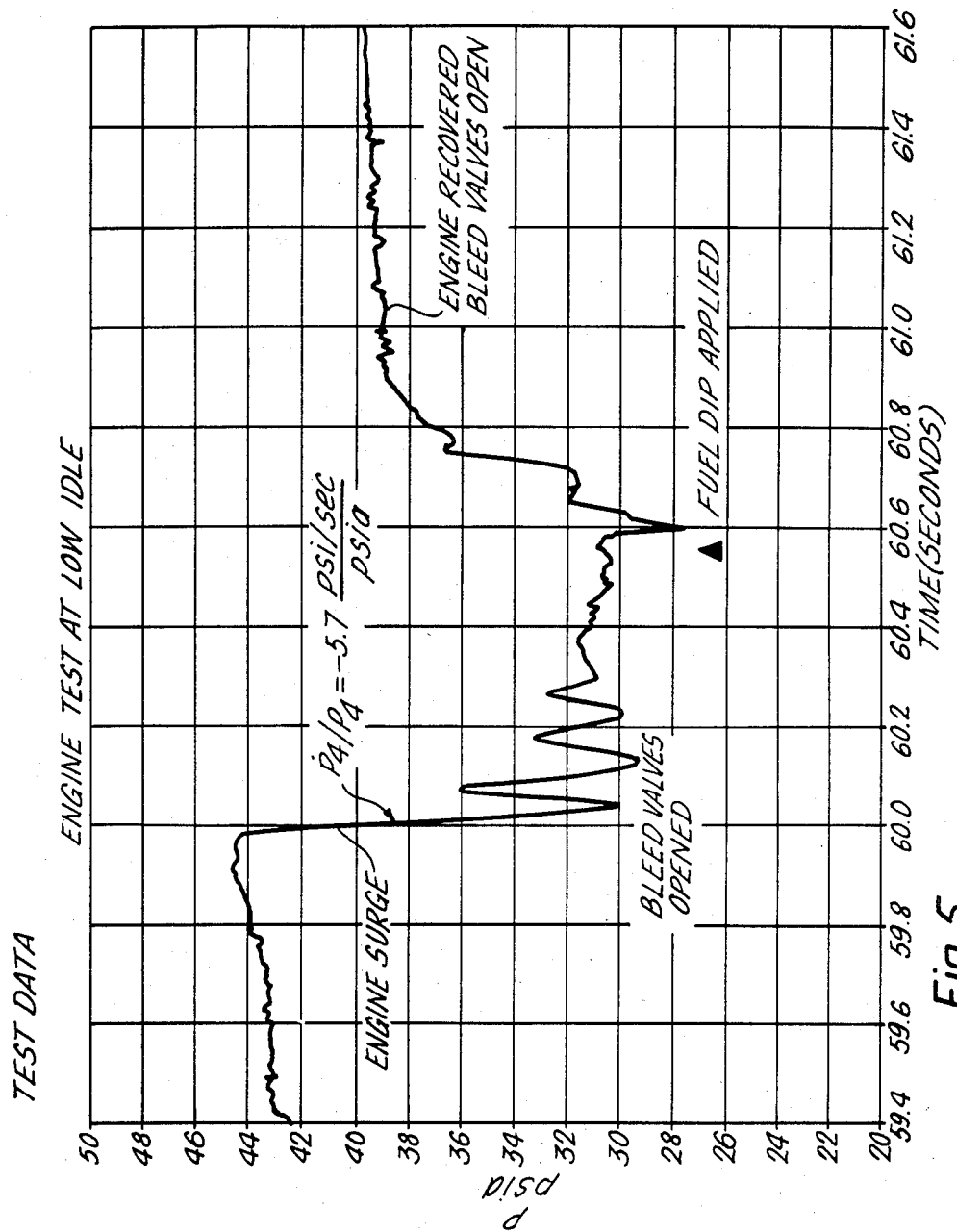
FIGS. 5 and 6 are graphs showing the result of tests involving the present invention.
Figure 6:
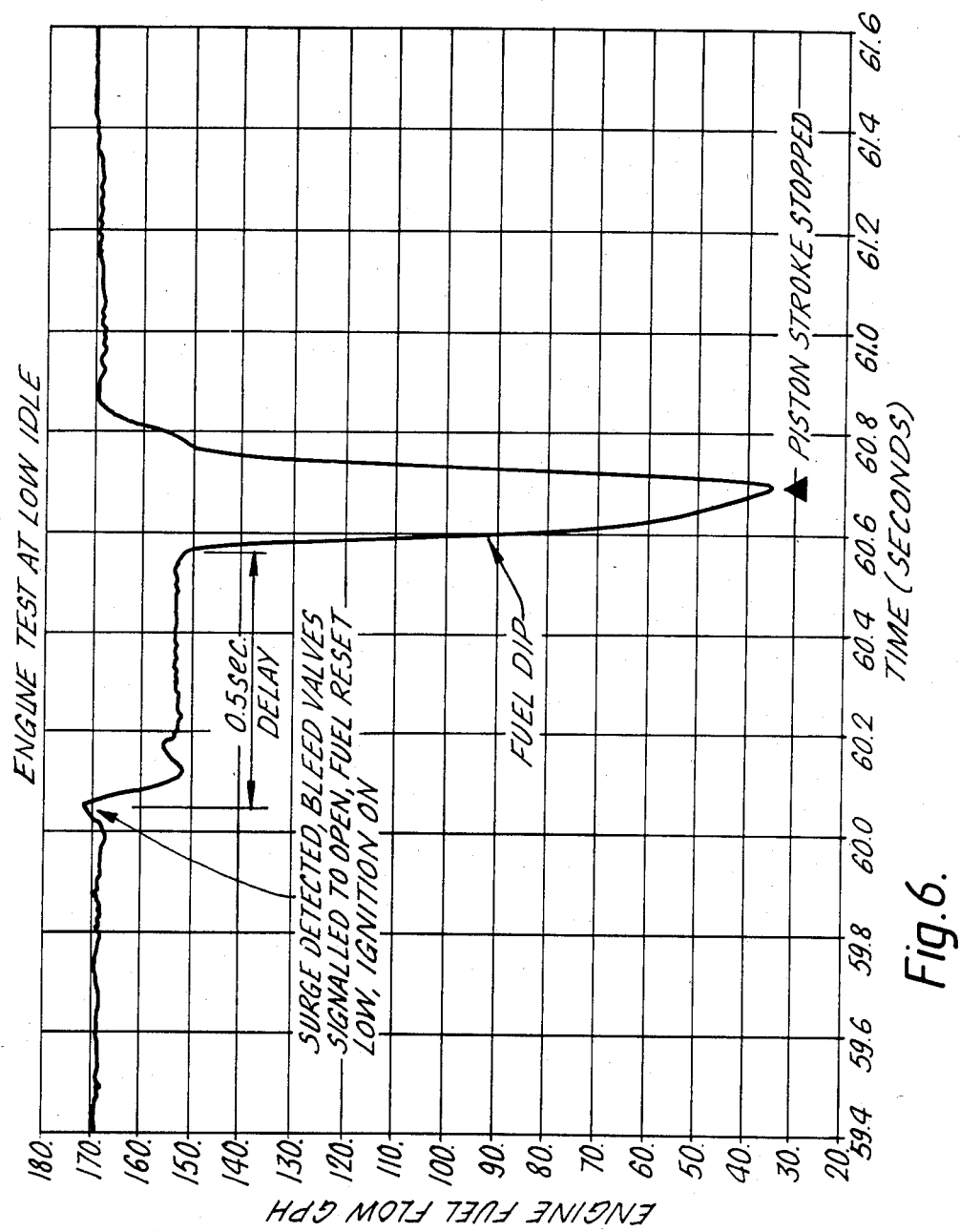

The results of engine tests on the system described in relation to FIGS. 2 to 4 are shown in FIGS. 5 and 6, which are graphical plots of compressor delivery pressure $P_p$ and engine fuel flow, respectively, against time in seconds. These tests were done on an engine which has been used for bird ingestion tests and hence had suffered damage.

The engine was run up to low idle and the bleed valves were closed. The act of closing the bleed valves with a damaged engine caused the engine to surge. This can be seen on FIG. 5 which shows the sharp drop in compressor delivery pressure $P_p$. P/P as measured by the surge detector is $-5.7$. The horizontal trend for $P_p$ following the surge represents operation of the compressor in a partially stalled mode consequent on the surge. The engine is shown recovering from the effects of the surge as $P_p$ trends upwards to a steady state value with bleed valves open after the fuel dip unit has operated. The fuel dip caused by operation of the fuel dip unit can be clearly seen in FIG. 6.

In FIG. 5 it will be seen that for the engine under test, recovery of the engine from the effects of the surge is only achieved after operation of the fuel dip unit. However, it is possible that in other engine types, opening of the bleed valves and resetting the fuel flow, or even merely opening the bleed valves, would be sufficient to completely overcome the surge and a fuel dip unit would not be needed.

I claim:

1. A method for automatically controlling compressor surge conditions in a gas turbine aeroengine, comprising in automatic sequence the steps of:
   (a) continuously monitoring the valve of the pressure at a predetermined location in the compressor;
   (b) detecting the onset of compressor surge conditions by detecting occasions when the ratio of the first derivative with respect to time of the monitored pressure to the monitored pressure itself is less than a predetermined reference value; and
   (c) initiating action to control the surge whenever the onset of surge conditions is detected.

2. A method according to claim 1, in which action to control the surge includes bleeding air from the compressor.

3. A method according to claim 1 in which action to control the surge includes reducing the mass flow of fuel to the aeroengine.

4. A method for automatically controlling compressor surge conditions in a gas turbine aeroengine equipped with compressor handling bleed valves, a bleed valve control unit, a fuel ignition unit, a fuel control system having a resettable fuel flow schedule, and means for temporarily but greatly reducing the flow of fuel to the aeroengine, the method comprising in automatic sequence the steps of:
   (a) continuously monitoring the value of the pressure at a predetermined location in the compressor;
   (b) detecting the onset of compressor surge conditions by detecting occasions when the ratio of the first derivative with respect to time of the monitored pressure to the monitored pressure itself is less than a predetermined reference value;
   (c) initiating action to control the surge whenever the onset of surge conditions is detected, said action including opening the compressor handling bleed valves according to a predetermined operating schedule of the bleed valve control unit, operating the fuel ignition unit for a predetermined period during which flameout is likely, resetting the fuel control system to a predetermined lower fuel flow schedule, and operating said means for temporarily but greatly reducing the flow of fuel to the aeroengine.

5. A method according to claim 1 or claim 4 in which the monitored pressure is the pressure at the outlet of the compressor.

6. Apparatus for automatically controlling compressor or surge conditions during operation of a gas turbine aeroengine, including:
   (a) pressure transducer means for producing a pressure signal representative of the value of the pressure at a predetermined location in the compressor;
   (b) data processing means adapted to monitor the pressure signal, produce therefrom the first derivative of the pressure signal with respect to time, determine the ratio of the first derivative of the pressure signal to the pressure signal itself, compare the value of the ratio with a predetermined reference value, and output at least one surge correction control signal when the ratio is less than the predetermined reference value; and
   (c) surge correction means adapted for actuation by the at least one surge correction control signal.

7. Apparatus according to claim 6 in which the predetermined location in the compressor is the outlet of the compressor.

8. Apparatus according to claim 6 in which the surge correction means includes bleed valve means for bleeding air from the compressor.

9. Apparatus according to claim 6 in which the surge correction means includes means for reducing the mass flow of fuel to the aeroengine.

10. Apparatus according to claim 9 in which the means for reducing the mass flow of fuel to the engine includes fuel flow scheduling means adapted to be reset to a lower range of fuel flows when a corresponding surge correction control signal is outputted from the data processing means.

11. Apparatus according to claim 9 in which the means for reducing the mass flow of fuel to the engine includes means adapted to temporarily but greatly reduce the flow of fuel to the aeroengine by withdrawing fuel from a main fuel supply line to the aeroengine.

12. Apparatus according to claim 6 in which the surge correction means includes a fuel ignition unit adapted to be operated for a predetermined period during which flameout is likely when a corresponding surge correction control signal is outputted from the data processing means.

* * * * *